US010766600B2

(12) United States Patent
Tsai et al.

(10) Patent No.: US 10,766,600 B2
(45) Date of Patent: Sep. 8, 2020

(54) ARTICULATION ASSEMBLIES FOR RETRACTING AIRCRAFT FLAP SUPPORT FAIRINGS AND RELATED METHODS

(71) Applicant: The Boeing Company, Chicago, IL (US)

(72) Inventors: Kevin Tsai, Seattle, WA (US); Jacob Virnig, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 464 days.

(21) Appl. No.: 15/663,431

(22) Filed: Jul. 28, 2017

(65) Prior Publication Data

US 2019/0031317 A1   Jan. 31, 2019

(51) Int. Cl.
*B64C 9/16*   (2006.01)
*B64C 9/34*   (2006.01)
*B64C 7/00*   (2006.01)
*B64C 3/50*   (2006.01)

(52) U.S. Cl.
CPC .................. *B64C 7/00* (2013.01); *B64C 9/16* (2013.01); *B64C 3/50* (2013.01); *B64C 9/34* (2013.01)

(58) Field of Classification Search
CPC .... B64C 3/50; B64C 9/16; B64C 9/34; B64C 7/00
See application file for complete search history.

(56) References Cited

U.S. PATENT DOCUMENTS

| 4,172,575 | A | * | 10/1979 | Cole | .......................... B64C 9/04 244/216 |
| 4,283,029 | A |   | 8/1981  | Rudolph | |
| 4,285,482 | A |   | 8/1981  | Lewis | |
| 4,434,959 | A | * | 3/1984  | Rudolph | .................... B64C 9/16 244/212 |
| 4,448,375 | A | * | 5/1984  | Herndon | .................... B64C 9/16 244/215 |
| 5,207,400 | A | * | 5/1993  | Jennings | .................... B64C 9/16 244/216 |
| 7,762,500 | B1 |   | 7/2010  | Dhall | |
| 8,336,830 | B2 |   | 12/2012 | Eberhardt | |
| 2006/0226297 | A1 | * | 10/2006 | Perez-Sanchez | ......... B64C 9/18 244/216 |
| 2008/0001036 | A1 | * | 1/2008  | Voogt | ........................ B64C 7/00 244/215 |

(Continued)

OTHER PUBLICATIONS

European Patent Office, "Extended European Search Report", issued in connection with European application No. 18182257.8 dated Nov. 13, 2018, 10 pages.

*Primary Examiner* — Philip J Bonzell
*Assistant Examiner* — Tye William Abell
(74) *Attorney, Agent, or Firm* — Hanley, Flight & Zimmerman, LLC

(57) ABSTRACT

Example articulation assemblies for retracting aircraft flap support fairing tailcones and related methods are described herein. An example flap support fairing disclosed herein includes a housing to be coupled to a bottom side of a flap on a trailing edge of a wing of an aircraft, a tailcone disposed outward from an aft end of the housing, and an articulation assembly configured to move the tailcone between an extended position in which a portion of the tailcone is disposed beyond the aft end of the housing and a retracted position in which the portion of the tailcone is disposed within the housing.

20 Claims, 6 Drawing Sheets

(56) References Cited

U.S. PATENT DOCUMENTS

2009/0166477 A1    7/2009   Bousfield
2012/0012696 A1*   1/2012   Sakurai .................... B64C 9/16
                                                                        244/99.3
2016/0340023 A1*   11/2016   Colaciti .................... B64C 7/00

* cited by examiner

ARTICULATION ASSEMBLIES FOR RETRACTING AIRCRAFT FLAP SUPPORT FAIRINGS AND RELATED METHODS

FIELD OF THE DISCLOSURE

This disclosure relates generally to aircraft and, more particularly, to articulation assemblies for retracting aircraft flap support fairings and related methods.

BACKGROUND

Many aircraft employ high lift devices, sometimes referred to as auxiliary airfoils or movable control surfaces, along the leading and trailing edges of the wings. For example, flaps are a common type of high lift device that are movably coupled along the trailing edge of a wing. The flaps may be moved (e.g., tilted) downward from the trailing edge of the wing to change the shape of the wing to generate more or less lift. The flaps are often deployed during takeoff and landing, for instance, to generate more lift at slower speeds. Aircraft typically have one or more flap supports, covered by flap support fairings, to help support each of the flaps on the wing. The flap support fairings extend outwardly beyond the trailing edges of the flaps and are aerodynamically shaped to reduce drag.

SUMMARY

An example flap support fairing disclosed herein includes a housing to be coupled to a bottom side of a flap on a trailing edge of a wing of an aircraft, a tailcone disposed outward from an aft end of the housing, and an articulation assembly configured to move the tailcone between an extended position in which a portion of the tailcone is disposed beyond the aft end of the housing and a retracted position in which the portion of the tailcone is disposed within the housing.

An example aircraft disclosed herein includes a wing, a flap movably coupled to the wing along a trailing edge of the wing, and a flap support fairing coupled to a bottom side of the flap. The flap support fairing has a retractable tailcone that is configured to move into a housing of the flap support fairing when the flap support fairing is moved downward.

An example method disclosed herein includes moving a flap support fairing downward relative to a trailing edge of a wing of an aircraft. The example method also includes moving a tailcone of the flap support fairing into a housing of the flap support fairing when the flap support fairing moves downward.

Figure 1:
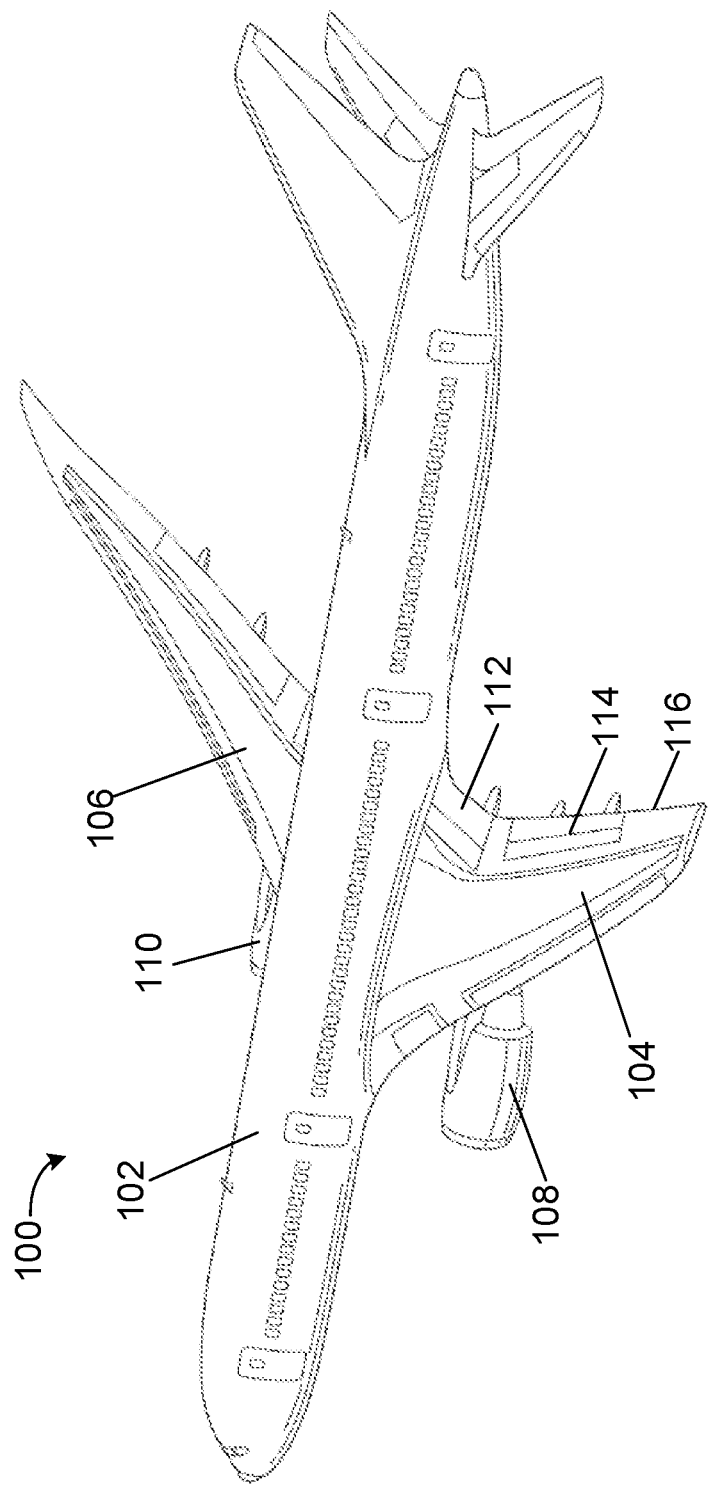
FIG. 1 illustrates an example aircraft in which the examples disclosed herein may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Many aircraft typically employ one or more high-lift devices along the leading and/or trailing edges of the wings. Flaps are a common type of high-lift device that are movably mounted along a trailing edge of a wing. A flap, for instance, is movable between a stowed position in which the flap is in line with the wing and a deployed position in which the flap is moved (and/or angled) downward from the trailing edge of the wing. Aircraft may include one or multiple flaps along the trailing edge of a wing. When deployed, the flap(s) change(s) the chord length and camber of the wing, which can be used to generate more or less drag and lift. As such, flaps are typically deployed during takeoff and landing.

Flap supports are commonly employed on the aircraft wings to help support the flaps along the trailing edge of the wing. The flap supports may be part of the actuation assembly that is used to deploy the flaps, for instance. Known flap supports include a fixed portion, referred to as a fixed side support or support beam, coupled to the wing (e.g., to a bottom of the wing) and a movable portion, referred to as moveable side support, that is coupled to a bottom side of the flap and moves with the flap when the flap is deployed or retracted. The moveable side support is rotatably coupled to the fixed side support, which enables the moveable side support to be tilted down when the flap is moved downward from the trailing edge of the wing. Flap supports are commonly covered with flap support fairings (sometimes referred to anti-shock bodies, Withcomb bodies, or Kuchemann carrots) that provide an aerodynamic casing that covers the flap support (and the portion of the actuation assembly) and reduces drag that may otherwise be caused thereby. The flap support fairings may include a fixed portion that is coupled to the bottom side of the wing and covers the fixed side support of the flap support and a moveable portion that is coupled to the bottom of the flap and covers the moveable side support of the flap support. The moveable portion of the flap support fairing extends beyond the trailing edge of the flap and the wing to reduce turbulence and drag.

It is often desired to position a flap support in line with an engine on the wing because this location is often the most structurally optimal for supporting the flap and provides the most aerodynamic configuration (instead of having two structures that are offset from each other). However, when the flap and the flap support fairing (the moveable portion of the flap support fairing) are moved downward, the flap support fairing is disposed directly in line with the engine plume, i.e., the hot exhaust gas exiting the engine. As result, the flap support fairing experiences a high amount of unwanted heat and vibration. As such, the flap support fairings are constructed of higher gauge material to handle the higher loads, which increases weight and costs. Other aircraft have moved the flap support (and the flap support fairing) further inboard or outboard from this location to avoid the engine plume. However, this can have undesirable effects on the flap loads. For instance, supporting the flap further outboard can lead to increased bending of the flap, which requires the flap to be made using higher gauge skin and spar materials and, thus, increases the costs and weight of the aircraft. On the other hand, supporting the flap further inboard sometimes requires an additional flap support to help share the load. However, because of the locations of the flap supports, one of the flap supports experiences a heavier load than the other, thereby requiring an increased gauge material for the flap support fairing and increased driving power for the flap support fairing. Further, this unbalanced load may not be desirable for fail safety concerns because one of the flap supports is not sharing a comparable amount of the load.

Also, some known aircraft utilize double slotted flaps or deep drooping flaps that extend significantly downward from the trailing edge of the wing when deployed. In some instances, the ends of the flap support fairings could be disposed so low that they may contact the runway when landing or another obstacle. Therefore, to ensure proper clearance and avoid contact with the runway or another obstacle, known aircraft have shortened the flap support fairing or reduced the amount of flap deployment. However, both of these solutions have adverse aerodynamic effects and reduce the aircraft's high and low speed performance. For instance, shortening the flap support fairing causes increased drag and, thus, reduces the aircraft's fuel efficiency in cruise conditions and increases costs to operate the aircraft. Further, reducing the amount of flap deployment reduces the lift capability during takeoff and landing. As such, the aircraft may require a longer runway to takeoff or higher approach speeds during landing, both of which increase the costs to operate the aircraft.

Disclosed herein are example flap support fairings that can be retracted and/or otherwise shortened when the flap support fairing is in a downward position. An example flap support fairing disclosed herein includes a housing and a tailcone that extends outward from an aft end of the housing. The example tailcone is moved (retracted) into the housing when the flap support fairing is moved downward (e.g., with a flap), which reduces the overall length of the flap support fairing. In particular, the tailcone is movable between an extended position in which the tailcone is aft of the housing and a retracted position in which the tailcone is disposed at least partially within the housing. As such, in the retracted position, less of the tailcone is disposed beyond the aft end of the housing compared to the extended position.

Example articulation assemblies are disclosed herein for moving the tailcone between the retracted position and the extended position. An example articulation assembly disclosed herein includes one or more links that are configured to pull the tailcone into the housing when the flap support fairing is moved downward (moving from a cruise position to a takeoff or landing position), and push the tailcone out of the housing when the flap support fairing is moved upward (moving from a takeoff or landing position to a cruise position). In some examples, the articulation assembly is implemented as a mechanical linkage assembly that automatically moves (retracts) the tailcone into the housing of the flap support fairing when the flap support fairing is moved downward. Thus, in some examples, the articulation assembly can be actuated without additional electronic devices, pumps, actuators, etc. In other examples, a separate actuation system (e.g., a hydraulically, pneumatically and/or electronically actuated system) may be used to move the tailcone relative to the housing and change the length of the flap support fairing.

Because the example flap support fairing can be shortened and does not extend as far as known flap support fairings in the downward position, the example flap support fairing (and the flap support disposed therein) can be disposed in line (or substantially in line) with an engine on the wing of the aircraft without subjecting the flap support fairing to the forces from the engine plume. Thus, the example flap support fairing can be constructed with lighter, cheaper materials because of the reduced loads, heat, and vibrations experienced by the flap support fairing. Further, as mentioned above, it is often advantageous to locate the flap support and associated flap support fairing in line with the engine because it produces a more aerodynamic configuration that reduces drag during cruise. Also, the fixed side support of the flap support and the flap support fairing can be coupled to and/or otherwise integrated with the engine pylon, which is more structurally efficient than having separate structures that are spaced part spanwise from each other along the wing. Further, disposing the flap support (and the associated flap support fairing) in line with the engine is often a central location on the flap and, thus, disposing the flap support in this location helps decrease bending of the flap. Therefore, unlike known aircraft designs that have the flap supports disposed further inboard or outboard of the engine and need increased skin and spar gauge, the example flap support fairing can be positioned in the most advantageous position in line with the engine. Thus, example flap support fairings result in decreased costs and weight associated with the aircraft.

Further, by retracting the tailcone of the example flap support fairing, the overall length of the flap support fairing is shortened when the flap is deployed. As described above, double slotted flaps or deep drooping flaps extend the flap support fairings relatively close to the ground, which may contact the runway when landing and/or other obstacles. Thus, the example flap support fairings disclosed herein reduce or eliminate the possibility that a flap support fairing may contact the runway during takeoff or landing. As such, the example flaps and the flap support fairings can be deployed lower or closer to the ground than known flaps. Therefore, the examples disclosed herein enable better performance during takeoff and landing.

In some examples, the articulation assembly is configured such that during a first portion of the downward movement of the flap support fairing the tailcone remains in the extended position, and during a second (later) phase of the downward movement the tailcone is retracted. Thus, the example articulation assembly enables the tailcone to remain extended and in the most aerodynamic position through a portion of the movement. In other words, the articulation assembly avoids unnecessarily moving the tailcone until the flap support fairing is at or near the downward position. As such, the tailcone may remain in the advantageous extended position during smaller movements of the flap without unnecessarily retracting the tailcone.

FIG. 1 illustrates an example aircraft 100 in which the examples disclosed herein may be implemented. In the illustrated example, the aircraft 100 includes a fuselage 102, a first wing 104 coupled to the fuselage 102, and a second wing 106 coupled to the fuselage 102. The aircraft 100 also includes a first engine 108 coupled to the first wing 104 and a second engine 110 coupled to the second wing 106. In other examples, the aircraft 100 may have multiple engines coupled to each of the first and second wings 104, 106 and/or disposed in other locations on the aircraft 100 (e.g., coupled to the fuselage 102, coupled to a tail section of the aircraft 100, etc.).

The first and second wings 104, 106 may have one or more control surfaces such as high lift devices (e.g., auxiliary airfoils) that are located along the leading and/or trailing edges of the first and second wings 104, 106. Such high lift devices may be displaced or extended from the leading and/or trailing edges of the first and second wings 104, 106 to change the aerodynamic lift of the aircraft 100 and are typically used during takeoff and landing. For example, in FIG. 1, the first wing 104 includes a first flap 112 (an inboard flap) and a second flap 114 (an outboard flap) disposed along a trailing edge 116 of the first wing 104. The first and second flaps 112, 114 may be moved downward relative to the trailing edge 116 of the first wing 104 to change the shape of the first wing 104, which is advantageous during takeoff and landing, for example. Similarly, the second wing 106 may include one or more flaps. It is understood that any disclosure relating to the first wing 104 can likewise be applied to the second wing 106. Thus, to avoid redundancy, a description of the second wing 106 is not provided herein.

Figure 2A:
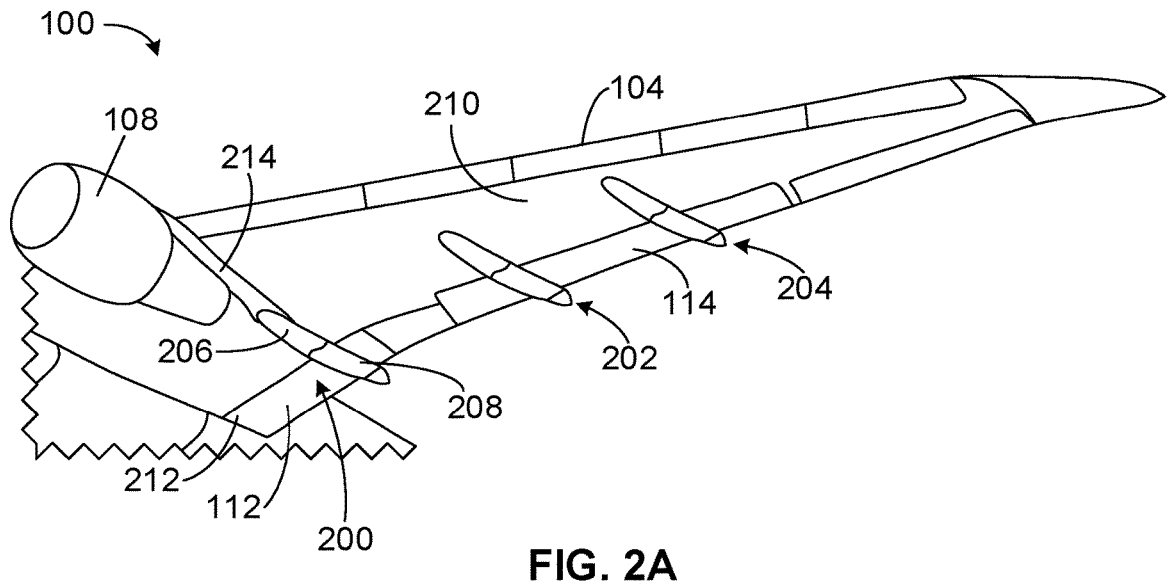
FIG. 2A is a bottom view of one of the wings of the example aircraft of FIG. 1 showing example flaps in a stowed position and showing a plurality of example flap supports with example flap support fairings coupled to the wing and the example flaps.
Figure 2B:
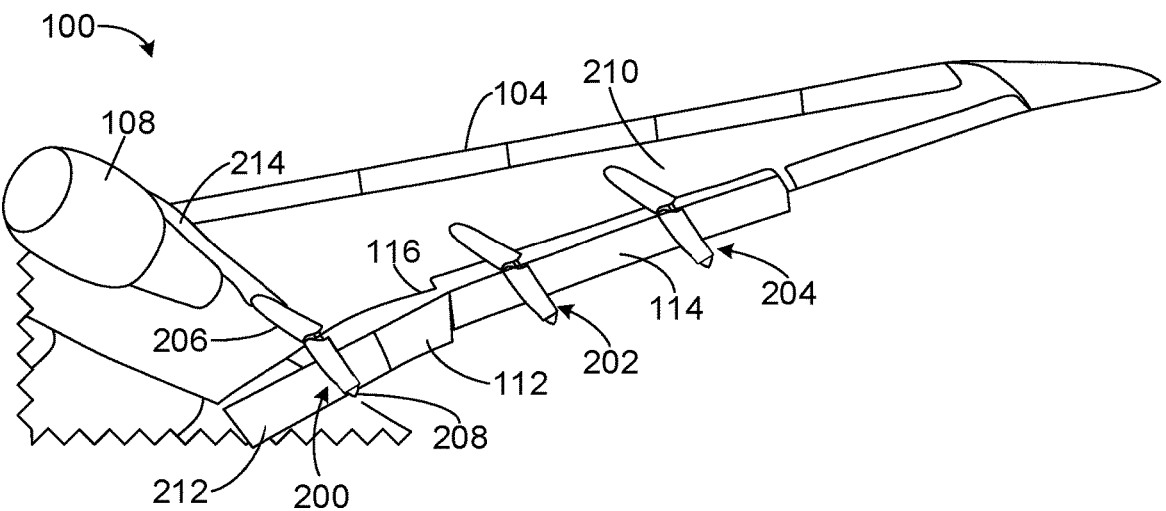
FIG. 2B is a bottom view of the wing of FIG. 2A showing the example flaps in a deployed position and the example flap support fairings in a downward position.

FIG. 2A shows a bottom side of the first wing 104 of the aircraft 100. In the illustrated example of FIG. 2A, the first and second flaps 112, 114 are in a stowed or retracted position. During cruise, for example, the first and second flaps 112, 114 are stowed in this position, which is generally more aerodynamic and fuel efficient. FIG. 2B shows the first and second flaps 112, 114 in a deployed or extended position, which is commonly used during takeoff and landing to increase the chord length of the first wing 104 to generate more lift.

To help support the first and second flaps 112, 114, the aircraft 100 may include a plurality of flap supports, which are covered by flap support fairings. In the illustrated example of FIGS. 2A and 2B, the aircraft 100 includes three flap supports (one of which is shown in further detail in connection with FIG. 3) covered by three flap support fairings: a first flap support fairing 200, a second flap support fairing 202, and a third flap support fairing 204. The first flap support fairing 200 (and the flap support therein) is associated with the first flap 112 and the second and third flap support fairings 202, 204 (and the respective flap supports therein) are associated with the second flap 114. However, in other examples, the first and second flaps 112, 114 may include more or fewer flap supports (with flap support fairings) and/or the flap supports (and flap support fairings) may be disposed in other locations.

The first flap support fairing 200 is moveable downward with the first flap 112 as shown between the positions in FIGS. 2A and 2B. In particular, in the illustrated example, the first flap support fairing 200 includes a first section 206 (e.g., a fixed section or wing-side section) that covers a fixed side support of the flap support (shown in connection with FIG. 3) and a second section 208 (e.g., a movable section or wing-side section) that covers a moveable side support of the flap support (shown in connection with FIG. 3). The first and second sections 206, 208 may be considered separate flap support fairings that form an overall flap support fairing that covers the flap support therein (disclosed in further detail in connection with FIG. 3). In the illustrated example, the first section 206 of the first flap support fairing 200 is coupled to a bottom side 210 (e.g., a bottom surface) of the first wing 104 and the second section 208 of the first flap support fairing 200 is coupled to a bottom side 212 of the first flap 112. In FIG. 2A, the second section 208 of the first flap support fairing 200 is in an up or static position (e.g., a cruise position). As the first flap 112 is moved downward (FIG. 2B), the second section 208 of the flap support fairing 200 is moved downward with the first flap 112 relative to the trailing edge 116 of the first wing 104.

In the illustrated example of FIGS. 2A and 2B, the second and third flap support fairings 202, 204 are substantially the same as the first flap support fairing 200. Thus, to avoid redundancy, a description of the second and third flap support fairings 202, 204 is not provided herein. Instead, the interested reader is directed to the detailed structures and operations disclosed in connection with the first flap support fairing 200, which can be equally applied to the second and/or third flap support fairings 202, 204.

As illustrated in FIGS. 2A and 2B, the first flap support fairing 200 (and the associated flap support therein) and the first engine 108 are substantially laterally aligned along the first wing 104 (e.g., aligned along a same chord of the first wing 104). In some instances, having a flap support in this position is advantageous, as it may be the most optimal position for supporting the first flap 112. Further, having the first flap support fairing 200 (and the associated flap support) in line with the first engine 108 is a more aerodynamic configuration than having the first flap support fairing 200 and the first engine 108 spaced apart spanwise. However, as can be seen from FIG. 2B, when in the deployed position, the flap support fairing 200 is tilted down behind the first engine 108. As disclosed in further detail herein, the example first flap support fairing 200 has a movable section (e.g., a tailcone) that can be retracted to avoid the plume path of the first engine 108. Therefore, unlike known flap support fairings, the example first flap support fairing 200 can be disposed in the more advantageous position aligned with the first engine 108 without subjecting to the first flap support fairing 200 to the plume of the first engine 108. In some examples, the first section 206 (and/or the fixed side support therein) of the first flap support fairing 200 is coupled to or integrated with a pylon 214 that couples the first engine 108 to the first wing 104. Further, in some instances, retracting the movable section prevents the first flap support fairing 200 from contacting the runway during landing or takeoff and/or other obstacles.

Figure 3:
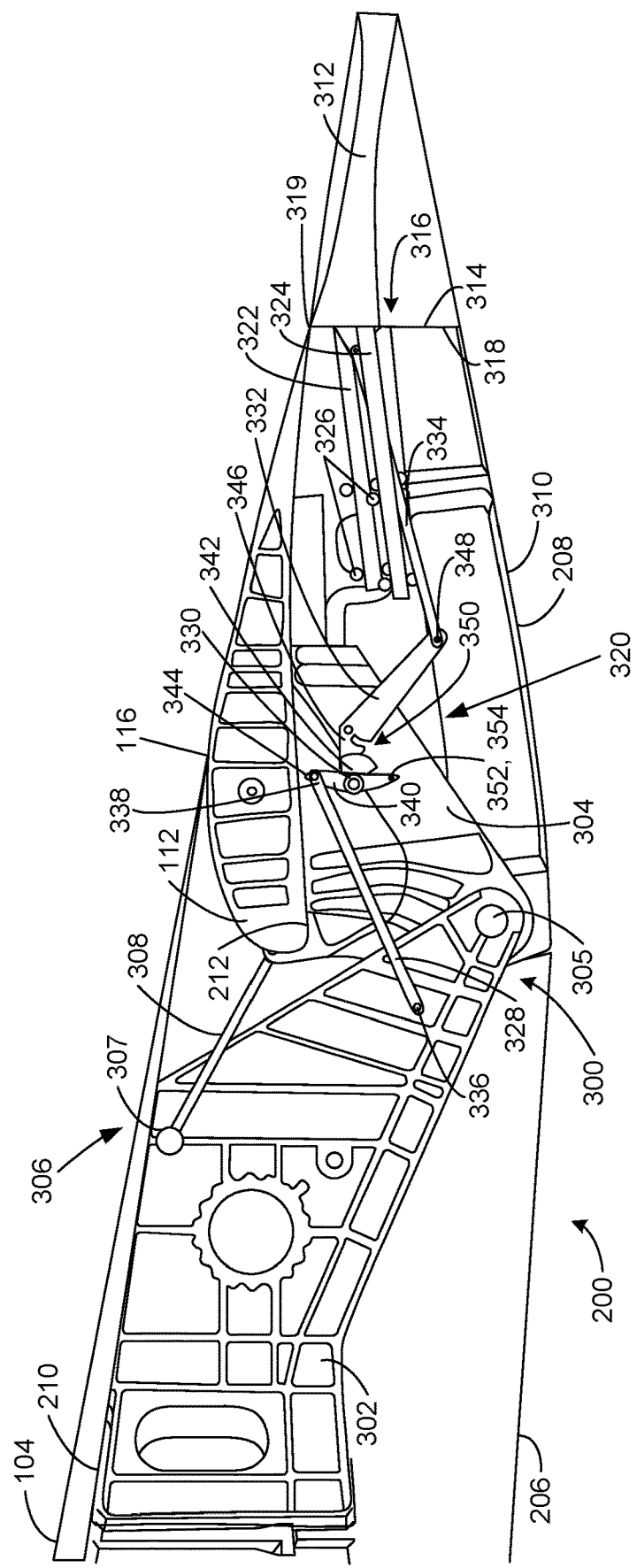
FIG. 3 is a partial cross-sectional view of one of the example flap support fairings of FIGS. 2A and 2B having an example articulation assembly to retract an example tailcone of the example flap support fairing.

FIG. 3 is a partial cross-sectional view showing the trailing edge 116 of the first wing 104 and the first flap support fairing 200. In the illustrated example, the first flap 112 is in the stowed position (e.g., the cruise position). The first flap 112 extends rearward of the trailing edge 116 of the first wing 104, thereby forming a substantially aerodynamic surface that reduces drag during cruise, for example. In the illustrated example, the first flap support fairing 200 covers a flap support 300 having a fixed side support 302 (e.g., a first section) and a moveable side support 304 (e.g., a second section) (sometimes referred to as a carrier beam) coupled to the fixed side support 302. In the illustrated example, the moveable side support 304 is shown as being hingeably coupled to the fixed side support 302 at a joint 305. However, in other examples, the moveable side support 304 may be coupled to and moveable relative to the fixed side support 302 via one or more other connections and/or joints to move the first flap 112 downward. In the illustrated example, the fixed side support 302 is coupled to the bottom side 210 of the first wing 104 and the moveable side support 304 is coupled to the bottom side 212 of the first flap 112. In other examples, the fixed side support 302 and the moveable side support 304 of the flap support 300 may be coupled to other locations on the first wing 104 and the first flap 112, respectively. In the illustrated example, the first section 206 of the first flap support fairing 200 is coupled to the bottom side 210 of the first wing 104 and covers the fixed side support 302 of the flap support 300 and the second section 208 of the first flap support fairing 200 is coupled to the bottom side 212 of the first flap 112 and covers the moveable side support 304 of the flap support 300.

In the illustrated example, the first flap 112 is moveable between the stowed position (as shown in FIGS. 2A and 3) and a deployed position (FIG. 2B) via a flap actuation system 306. In the illustrated example, the flap actuation system 306 includes an actuator 307 (e.g., a geared rotary actuator (GRA)) that moves a flap link arm 308 coupled to the moveable side support 304 and, thus, to the first flap 112. When actuated, the flap link arm 308 rotates the moveable side support 304 downward, thereby moving the first flap 112 outward and downward from the trailing edge 116 of the first wing 104, which causes the first flap support fairing 200 (the second section 208) to move downward with the first flap 112. In other examples, the flap actuation system 306 may include more links or drive devices to move the first flap 112 between the stowed and extended positions. The first flap support fairing 200 may be used cover the flap actuation system 306 and/or any other flap actuation system part(s) to reduce drag and, thus, increase fuel efficiency of the aircraft.

In the illustrated example of FIG. 3, the second section 208 of the first flap support fairing 200 includes a housing 310 and a tailcone 312 (e.g., a movable section) that is disposed outward from and movably coupled to the housing 310. As disclosed in further detail herein, the tailcone 312 is movable into and out of the housing 310 (e.g., telescoping) to change a length of the first flap support fairing 200. In particular, the tailcone 312 is movable between an extended or deployed position, as illustrated in FIG. 3, and a stowed or retracted position in which the tailcone 312 is moved, at least partially, into the housing 310. In the illustrated example, the housing 310 has an aft end 314 with an opening 316. When the tailcone 312 is in the extended position, as illustrated in FIG. 3, a forward end 318 of the tailcone 312 is substantially aligned with (or may be spaced apart from) the aft end 314 of the housing 310 and has a substantially similar diameter (e.g., within 0.5 inches) as the opening 316 in the aft end 314 of the housing 310. As such, the housing 310 and the tailcone 312 form a substantially smooth aerodynamic surface that reduces drag. In the illustrated example, the tailcone 312 extends outwardly and beyond a trailing edge 319 of the first flap 112. In the illustrated example, the trailing edge 319 of the first flap 112 is aligned with the aft end 314 of the housing 310. However, in other examples, the trailing edge 319 of the first flap 112 may extend beyond the aft end 314 of the housing 310 or may be forward of the aft end 314 of the housing 310.

To move the tailcone 312 between the extended position and the retracted position (and/or any position therebetween), the example first flap support fairing 200 includes an example articulation assembly 320. The articulation assembly 320 is configured to move the tailcone 312 from the extended position to the retracted position as the housing 310 is moved downward relative to the first wing 104. In the illustrated example, the articulation assembly 320 includes a first track 322 and a second track 324 that are slidable along a plurality of rollers 326 (two of which are referenced in FIG. 3) disposed inside the housing 310. The first and second tracks 322, 324 are coupled to the forward end 318 of the tailcone 312. As such, the tailcone 312 is movable into and out of the housing 310 via sliding engagement of the first and second tracks 322, 324 and the plurality of rollers 326. While in the illustrated example two tracks are implemented, in other examples, only one of the first or second tracks 322, 324 may be implemented or more than two tracks may be implemented.

To move the tailcone 312 relative into and out of the housing 310, the example articulation assembly 320 includes a driving link arm 328, a cam 330, a slotted link arm 332, and a drag link arm 334. In the illustrated example of FIG. 3, the driving link arm 328 has a first end 336 and a second end 338 opposite the first end 336. The first end 336 of the driving link arm 328 is rotatably coupled to the fixed side support 302 of the flap support 300 and the second end 338 of the driving link arm 328 is rotatably coupled to the cam 330. The cam 330 is rotatably coupled to the moveable side support 304 of the flap support 300. In particular, in the illustrated example, the cam 330 includes a lever arm 340 and a rider 342 (which may be referred to as a sliding surface, stop, or cam) rotatably coupled to the moveable side support 304. The second end 338 of the driving link arm 328 is rotatably coupled to a first end 344 of the lever arm 340.

In the illustrated example, the slotted link arm 332 includes a first end 346 and a second end 348 opposite the first end 346. The slotted link arm 332 is rotatably coupled to the fixed side support 302 of the flap support 300 near the first end 346 of the slotted link arm 332. The slotted link arm 332 includes a slot 350 that is to receive a pin 352 on a second end 354 of the lever arm 340. For example, when the lever arm 340 of the cam 330 is rotated (counter-clockwise in FIG. 3), the pin 352 on the second end 354 of the lever arm 340 engages the slot 350, which causes the first end 346 of the slotted link arm 332 to move upward and rotate in the clockwise direction in FIG. 3. Therefore, the driving link arm 328 is configured to rotate the cam 330 and move the slotted link arm 332 when the housing 310 of the first flap support fairing 200 is moved downward. In the illustrated example, the second end 348 of the slotted link arm 332 is coupled to the forward end 318 of the tailcone 312 via the drag link arm 334. As the second end 348 of the slotted link arm 332 is rotated (clockwise in FIG. 3), the drag link arm 334 pulls the tailcone 312 into the housing 310.

Figure 4A:
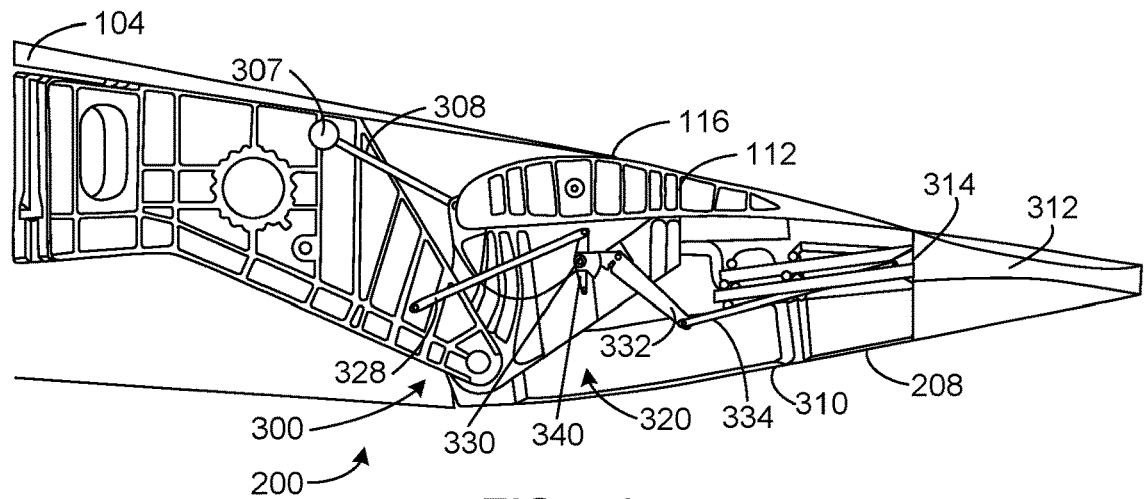
FIGS. 4A-4F illustrate an example sequence showing the example articulation assembly of FIG. 3 retracting the example tailcone as the example flap support fairing is moved downward.
Figure 4B:
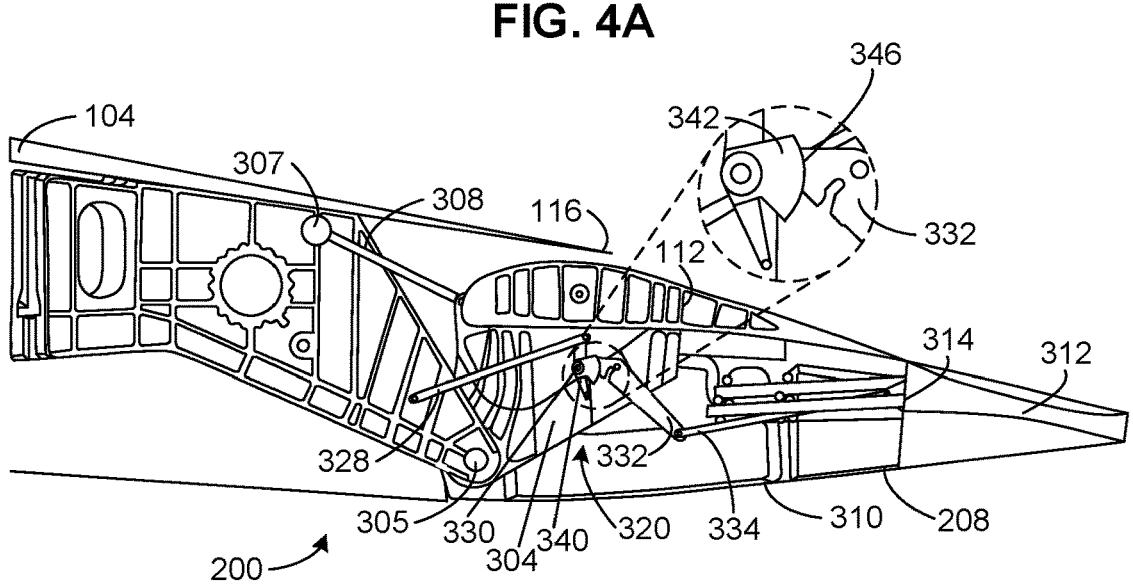
Figure 4C:
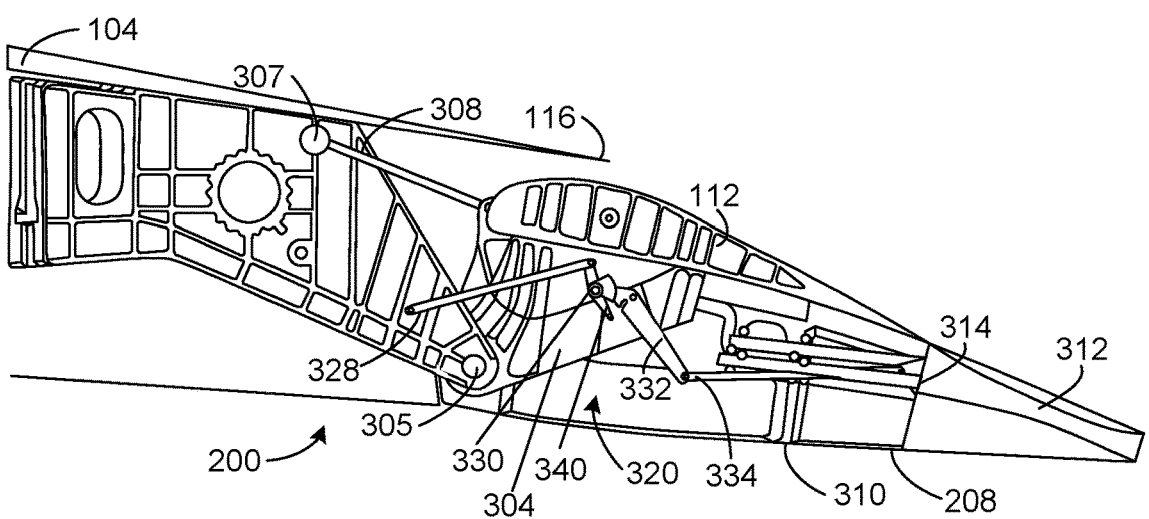

FIGS. 4A-4F illustrate an example sequence showing the articulation assembly 320 retracting the tailcone 312 while the first flap 112 is deployed and the first flap support fairing 200 (e.g., the second section 208) is moved downward. In FIG. 4A, the first flap 112, the flap support 300, and the first flap support fairing 200 are in the stowed position or up position and the tailcone 312 is in the extended position (e.g., the cruise position). When the first flap 112 is to be deployed, such as during landing or takeoff, the actuator 307 extends the flap link arm 308, which pushes the moveable side support 304 and, thus, moves the first flap 112 outward and downward relative to the trailing edge 116 of the first wing 104, as illustrated in FIGS. 4B and 4C. As illustrated in FIGS. 4B and 4C, the second section 208 of the first flap support fairing 200 is moved in a downward direction with the first flap 112. As the second section 208 of the first flap support fairing 200 moves downward, the driving link arm 328 of the articulation assembly 320 rotates the lever arm 340 of the cam 330 in the counter-clockwise direction in FIGS. 4A-4C. During this phase of movement, the tailcone 312 remains in the extended position. In particular, the slotted link arm 332 is not rotated by the lever arm 340, so the slotted link arm 332, the drag link arm 334, and the tailcone 312 remain in the same position relative to the housing 310. Also, in some examples, to prevent the tailcone 312 from inadvertently moving into out of the housing 310, the rider 342 prevents the slotted link arm 332 from rotating. For example, as illustrated in the callout in FIG. 4B, the rider 342 is engaged and/or otherwise slides along the first end 346 of the slotted link arm 332. As such, the slotted link arm 332 is prevented from rotating in either direction until the rider 342 clears the first end 346 of the slotted link arm 332.

Figure 4D:
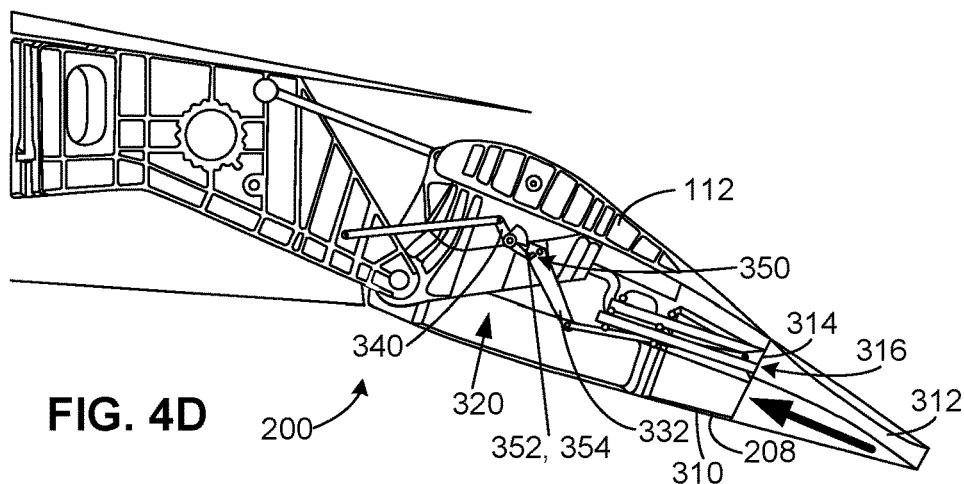
Figure 4E:
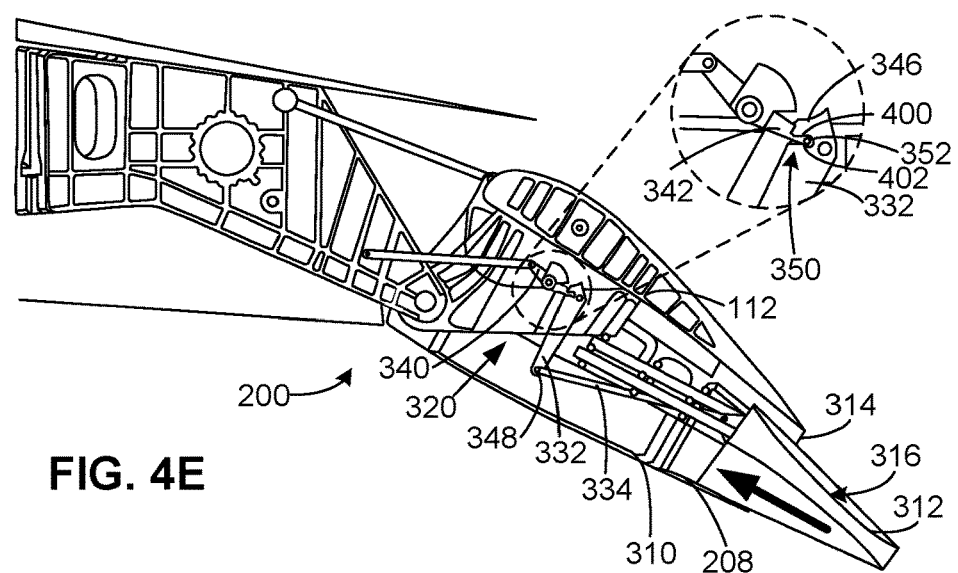
Figure 4F:
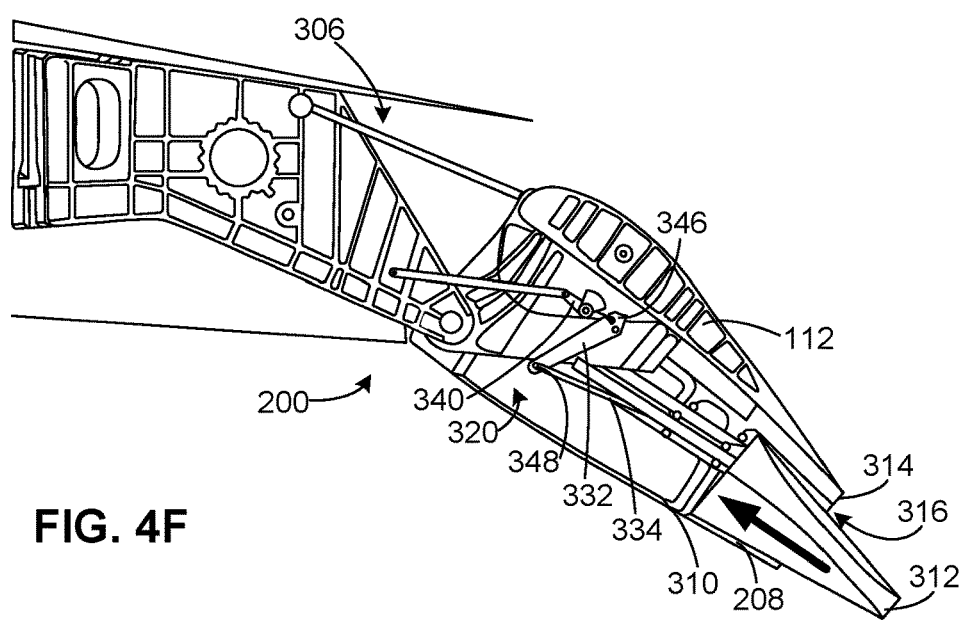

As the first flap 112 and the first flap support fairing 200 are moved downward, as shown in FIG. 4D, the pin 352 on the second end 354 of the lever arm 340 is rotated into the slot 350 of the slotted link arm 332. As this motion continues, as shown in FIGS. 4E and 4F, the lever arm 340 moves the first end 346 of the slotted link arm 332 upward. In particular, as shown in the callout in FIG. 4E, the pin 352 on the lever arm 340 slides along a first wall 400 of the slot 350, which pushes the first end 346 of the slotted link arm 332 upward. This movement rotates the second end 348 of the slotted link arm 332 (in the clockwise direction in FIGS. 4E and 4F), thereby moving the second end 348 of the slotted link arm 332 and the drag link arm 334 away from the aft end 314 of the housing 310. As a result, the drag link arm 334 pulls the tailcone 312 into the housing 310. As illustrated in FIGS. 4D-4F, the tailcone 312 is moved into the housing 310 through the opening 316 in the aft end 314 in the direction of the arrow.

In FIG. 4F, the first flap 112 is in the deployed position and the flap actuation system 306 ceases movement. As illustrated, the tailcone 312 is in the retracted position and has been moved into the housing 310. As such, the overall length of the first flap support fairing 200 is less and extends downward less than in known fairings, which prevents an end (e.g., the tailcone 312) of the first flap support fairing 200 from being disposed in the plume path of the first engine 108 (FIG. 1) and/or potentially contacting the runway during landing or takeoff. Thus, the example first flap support fairing 200 can be employed with an inboard flap and located in line (or substantially in line) with an engine on the wing.

As can be seen from FIGS. 4A-4F, a portion (e.g., the portion disposed within the housing 310 in FIG. 4F) of the tailcone 312 that is disposed beyond the aft end 314 of the housing 310 in the extended position is moved into the housing 310 in the retracted position. Thus, the overall length of the first flap support fairing 200 is reduced. In the retracted position illustrated in FIG. 4F, the tailcone 312 is partially disposed within the housing 310 and a portion (e.g., a second portion) extends beyond the aft end 314 of the housing 310. However, in other examples, the tailcone 312 may be completely disposed within the housing 310 such that none of the tailcone 312 extends outwardly beyond the aft end 314 of the housing 310.

As can be seen in FIGS. 4A-4F, during a first phase of the movement (e.g., FIGS. 4A-4C), the tailcone 312 remains extended and, during a second phase of the movement (FIGS. 4D-4F), the tailcone 312 is moved or retracted. In some examples, this delay in the retraction of the tailcone 312 avoids unnecessarily retracting the tailcone 312. For example, in some instances during flight (e.g., during a pitch up), it may be advantageous to partially deploy the first flap 112 without retracting the tailcone 312. Thus, the example articulation assembly 320 enables the tailcone 312 to remain extended until close to the end of the flap down sequence where it is advantageous to retract the tailcone 312. Also, near the end of the flap down sequence, the aerodynamic effect of the first flap support fairing 200 is minimal, so retracting the tailcone 312 during this phase has negligible effects. Further, when moving the first flap 112 and the first flap support fairing 200 back to the cruise or static position, the tailcone 312 is moved back to the extended position relatively early in the movement sequence. In other examples, the articulation assembly 320 may be configured to move the tailcone 312 earlier or later in the sequence.

To move the tailcone 312 back to the extended position, the example sequence of FIGS. 4A-4F may be performed in reverse. In particular, the flap actuation system 306 may move the flap support 300, along with the first flap 112 and the first flap support fairing 200 upward relative to the trailing edge 116 of the first wing 104. As the second section 208 of the first flap support fairing 200 is moved upward, the driving link arm 328 rotates the cam 330 in the opposite direction. As a result, the pin 352 on the second end 354 of the lever arm 340 rotates the slotted link arm 332 in the opposite direction (the counter-clockwise direction). For example, as illustrated in the callout in FIG. 4E, the pin 352 slides against a second wall 402 of the slot, thereby forcing the second end 348 of the slotted link arm 332 downward, thereby rotating the slotted link arm 332 in the opposite direction and pushing the drag link arm 334 toward the aft end 314 of the housing 310. The drag link arm 334 moves the tailcone 312 outward to the extended position (FIGS. 4A-4C). Therefore, during cruise, for example, the articulation assembly 320 can move the tailcone 312 to the extended position (e.g., FIG. 4A) and, during takeoff or landing, for example, the articulation assembly 320 can move the tailcone 312 to the retracted position (e.g., FIG. 4F).

While in the illustrated example the tailcone 312 is moved into the housing 310 to shorten the overall length of the first flap support fairing 200, in other examples, the tailcone 312 may instead may be moved in the forward direction to receive a section of the housing 310, thereby shortening the overall length of the first flap support fairing 200. For example, the aft section of the housing 310 may be a similar or small diameter than the forward end 318 of the tailcone 312. As the tailcone 312 moves forward (to the retracted position), the aft section of the housing 310 is moved into the tailcone 312, thereby shortening the overall length of the first flap support fairing 200.

Figure 5:
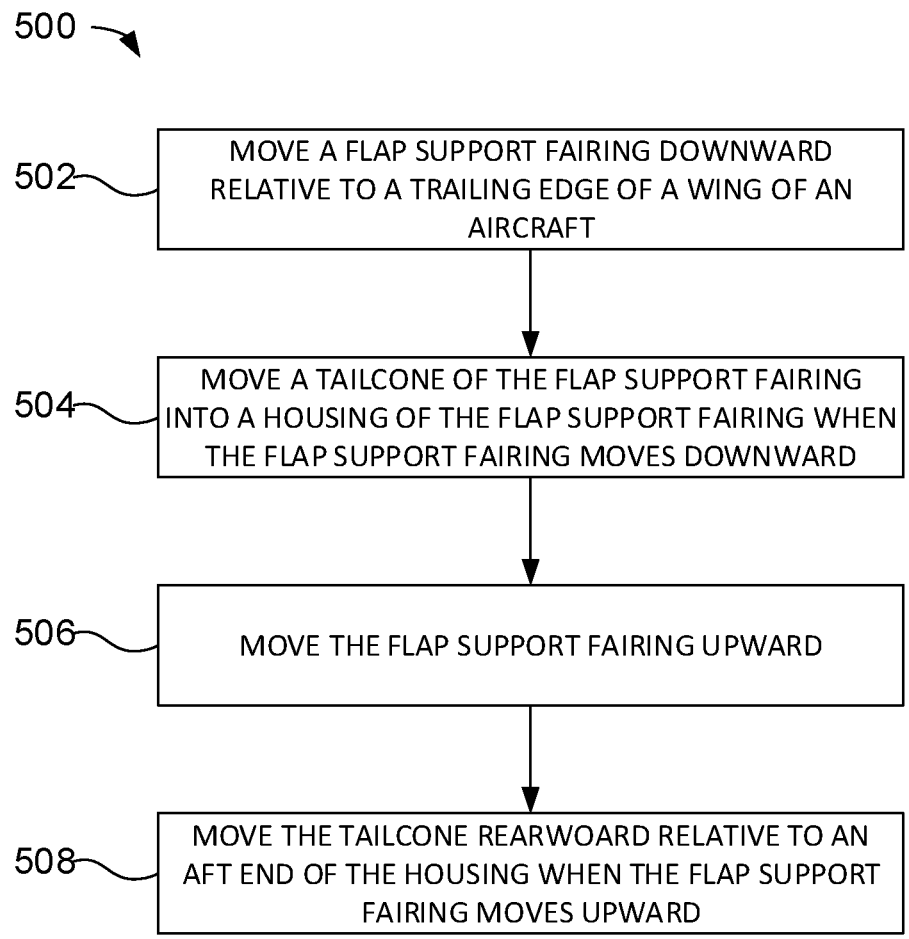
FIG. 5 is a flowchart representative of an example method for retracting and extending an example flap support fairing and which may be implemented using the example flap support fairing and the example articulation assembly of FIG. 3.

FIG. 5 is a flowchart representative of an example method 500 for retracting and extending a tailcone (e.g., a movable section) of a flap support fairing using an example articulation assembly. The example method 500 is described in connection with the example first flap support fairing 200 and the example articulation assembly 320 disclosed above. However, in other examples, other types of articulation assemblies may be used to retract and/or extend a tailcone of a flap support fairing.

At block 502, the example method 500 includes moving the first flap support fairing 200 (e.g., the second section 208 of the first flap support fairing 200) downward relative to the trailing edge 116 of the first wing 104. As illustrated in FIG. 3, the second section 208 of the first flap support fairing 200 is coupled to the bottom side 212 of the first flap 112, and the moveable side support 304 of the flap support 300 is also coupled to the bottom side 212 of the first flap 112 and coupled (e.g., hingeably coupled) to the fixed side support 302 on the first wing 104. In some examples, the first flap support fairing 200 is moved downward with the first flap 112 when the first flap 112 is deployed via the flap actuation system 306. For examples, as the flap actuation system 306 moves the moveable side support 304 downward, the first flap 112 and the first flap support fairing 200 are also moved downward. In other examples, a separate actuation system may be used to move the first flap support fairing 200 separate from the first flap 112.

At block 504, the example method 500 includes moving the tailcone 312 into the housing 310 when the first flap support fairing 200 moves downward. As illustrated in FIGS. 4D-4F, the articulation assembly 320 pulls the tailcone 312 into the opening 316 in the aft end 314 of the housing 310 as the first flap support fairing 200 moves downward and, thus, decreases the overall length of the first flap support fairing 200. The articulation assembly 320 may cease movement once movement of the first flap support fairing 200 is stopped (e.g., by deactivating the flap actuation system 306). In some examples, during a first portion of the movement (e.g., FIGS. 4A-4C) the tailcone 312 remains stationary relative to the housing 310 and, during a second portion of the movement (e.g., FIGS. 4D-4F), the tailcone 312 is translated into the housing 310.

To extend the tailcone 312, the example process is performed in reverse. For example, at block 506, the example method 500 includes moving the first flap support fairing 200 (the second section 208 of the first flap support fairing 200) upward. The first flap support fairing 200 may be moved upward when the flap actuation system 306 retracts the first flap 112, for example. At block 508, the example method includes moving the tailcone 312 rearward relative to the aft end 314 of the housing 310 when the first flap support fairing 200 moves upward. As illustrated in the reverse of FIGS. 4D-4F, as the first flap support fairing 200 is moved upward, the articulation assembly 320 moves the tailcone 312 rearward to extend from the aft end 314 of the housing 310 and, thus, increases the overall length of the first flap support fairing 200.

From the foregoing, it will be appreciated that the above disclosed flap support fairings have movable tailcones that may be retracted to reduce the length of the flap support fairing. As a result, when a flap is deployed and the flap support fairing is in the downward position, the flap support fairing can be shortened to avoid being disposed in an engine plume and/or contacting the ground during landing as seen in known flap support fairings. Further, by enabling the flap support fairing to be shortened, the flap support fairing can be disposed along the wing in line with the engine, which is a more optimal location for supporting the flap while reducing or eliminating the possibility of subjecting the flap support fairing to the engine plume.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. A flap support fairing comprising:
a housing to be coupled to a bottom side of a flap on a trailing edge of a wing of an aircraft;
a tailcone disposed outward from an aft end of the housing; and
an articulation assembly configured to move the tailcone between an extended position in which a portion of the tailcone is disposed beyond the aft end of the housing and a retracted position in which the portion of the tailcone is disposed within the housing, the articulation assembly configured to move the tailcone from the extended position to the retracted position when the housing is moved downward relative to the wing.

2. The flap support fairing of claim 1, wherein the articulation assembly includes a track coupled to the tailcone and a plurality of rollers disposed within the housing, and wherein the tailcone is configured to move into and out of the housing via sliding engagement of the track and the rollers.

3. The flap support fairing of claim 1, wherein the portion is a first portion and, in the retracted position, a second portion of the tailcone extends beyond the aft end of the housing.

4. The flap support fairing of claim 1, wherein the articulation assembly is configured to maintain the tailcone in the extended position during cruise of the aircraft and configured to move the tailcone to the retracted position during takeoff or landing of the aircraft.

5. The flap support fairing of claim 1, wherein the aft end of the housing has a substantially similar diameter as a forward end of the tailcone.

6. A flap support fairing comprising:
a housing to be coupled to a bottom side of a flap on a trailing edge of a wing of an aircraft;
a tailcone disposed outward from an aft end of the housing; and
an articulation assembly configured to move the tailcone between an extended position in which a portion of the tailcone is disposed beyond the aft end of the housing and a retracted position in which the portion of the tailcone is disposed within the housing, the articulation assembly including a slotted link arm rotatably coupled to a moveable side support of a flap support disposed in the housing, the slotted link arm configured to move the tailcone as the slotted link arm rotates.

7. The flap support fairing of claim 6, wherein the slotted link arm is coupled to the tailcone via a drag link arm.

8. The flap support fairing of claim 6, wherein the articulation assembly further includes:
a cam rotatably coupled to the moveable side support, and wherein the cam is configured to engage the slotted link arm; and
a driving link arm having a first end rotatably coupled to a fixed side support of the flap support and a second end rotatably coupled to the cam, wherein the driving link arm is configured to rotate the cam to engage and move the slotted link arm when the housing moves downward relative to the wing.

9. An aircraft comprising:
a wing;
a flap movably coupled to the wing along a trailing edge of the wing; and
a flap support fairing including:
a housing coupled to a bottom side of the flap; and
a retractable tailcone that is configured to move into the housing when the housing is moved downward with the flap.

10. The aircraft of claim 9, further including a flap support coupled to the wing and the flap, wherein the flap support fairing covers the flap support.

11. The aircraft of claim 9, further including a flap actuation system, wherein the flap actuation system is configured to move the flap and the housing in a downward direction relative to the trailing edge of the wing.

12. The aircraft of claim 9, wherein the flap support fairing includes a first section coupled to a bottom side of the wing and a second section coupled to the bottom side of the flap, the second section movable relative to the first section when the flap is moved, the second section including the housing and the retractable tailcone.

13. The aircraft of claim 9, wherein the retractable tailcone is configured to move linearly into and out of the housing.

14. The aircraft of claim 9, further including an engine coupled to the wing, wherein the flap support fairing and the engine are substantially laterally aligned along the wing.

15. The aircraft of claim 14, wherein the engine is coupled to the wing via a pylon, and wherein the flap support fairing is coupled to the pylon.

16. The aircraft of claim 9, wherein the retractable tailcone is movable between an extended position in which a forward end of the retractable tailcone is disposed at or beyond an aft end of the housing and a retracted position where the retractable tailcone is disposed at least partially within the housing.

17. The aircraft of claim 16, wherein, during cruise of the aircraft, the retractable tailcone is in the extended position and, during takeoff or landing of the aircraft, the retractable tailcone is in the retracted position.

18. A method comprising:
   moving a flap support fairing downward relative to a trailing edge of a wing of an aircraft; and
   moving a tailcone of the flap support fairing into a housing of the flap support fairing when the flap support fairing moves downward, wherein, during a first portion of the moving the flap support fairing, the tailcone remains stationary relative to the housing, and during a second portion of the moving the flap support fairing, the tailcone translates into the housing.

19. The method of claim 18, wherein the wing includes a flap extending from the trailing edge of the wing, wherein the moving the flap support fairing downward includes deploying the flap via a flap actuation system, and wherein the flap support fairing is coupled to a bottom side of the flap such that the deploying the flap moves the flap support fairing downward.

20. The method of claim 18, further including:
   moving the flap support fairing upward; and
   moving the tailcone rearward relative to an aft end of the housing when the flap support fairing moves upward.

* * * * *